Jan. 14, 1958
G. B. WARREN
2,819,819
BREAD DISPENSER
Filed Feb. 6, 1953
2 Sheets-Sheet 1
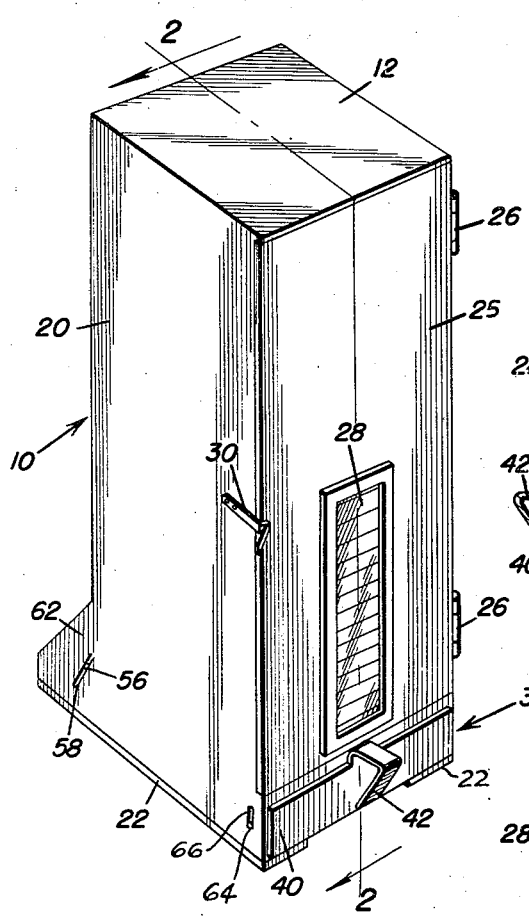
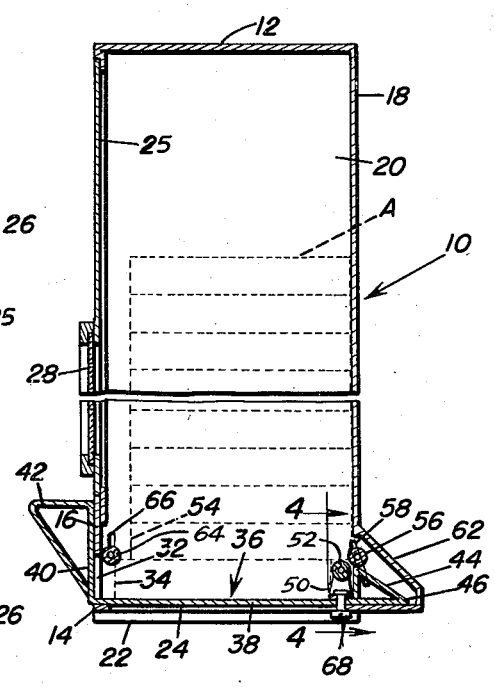
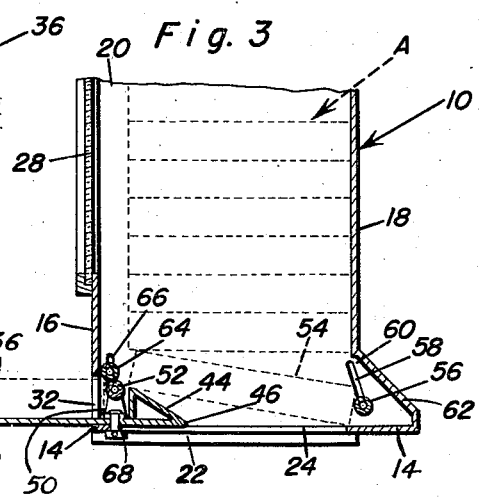
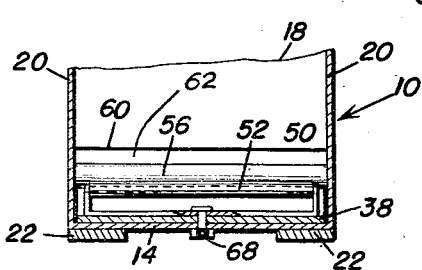
George B. Warren
INVENTOR.

Jan. 14, 1958

G. B. WARREN 2,819,819

BREAD DISPENSER

Filed Feb. 6, 1953

George B. Warren
INVENTOR.

BY *Clarence A. O'Brien*
*and Harvey B. Jacobson*
Attorneys

United States Patent Office 2,819,819
Patented Jan. 14, 1958

2,819,819

BREAD DISPENSER

George B. Warren, Los Angeles, Calif.

Application February 6, 1953, Serial No. 335,467

1 Claim. (Cl. 221—256)

The present invention relates to certain new and useful improvements in individual article holding and dispensing devices and has more particular reference to one which is especially, but not necessarily, adapted to protectively hold a loaf or more of sliced bread and which effectively functions to deliver the slices one-by-one for convenience of use.

One object of the invention is to structurally, functionally and otherwise improve upon holding and dispensing devices in the same general category through the utilization and satisfactory cooperation of required mechanical expedients capable of achieving the desired end results in a manner to satisfy the requirements of manufacturers and general needs of users in the home, restaurants or elsewhere.

A further object, generally speaking, is to improve upon and reduce the number of parts entering into the combination thereby not only increasing the efficiency of the structure as a whole, but also rendering the same less costly to manufacture and otherwise simplifying factors of assembling and sale.

In carrying out a preferred embodiment of the invention, a container of suitable capacity is provided. This is preferably formed with a door-closed-opening in one side to permit the loaf of sliced bread to be conveniently inserted for step-by-step dispensing purposes. An inspection window, if desired, is included. Slot means in the front wall adjacent the bottom permits the slices to be ejected and withdrawn one-by-one. A projectible and retractible ejector or tray is mounted in the bottom of the container to pick up the slices one-by-one and to deliver them through the slot for use.

Stated otherwise, the invention is characterized by a container for stacking the individual slices which are to be dispensed, said container having enclosing walls including a bottom wall and a front wall perpendicular to said bottom wall, said front wall having an article delivery slot adjacent to said bottom wall, an article receiving, ejecting and delivering tray slidably mounted in said container and having its leading end aligned with and slidable outwardly through and beyond said slot, and an article actuated thickness gage operably mounted in said container in cooperative relation to said slot and tray to limit dispensing to a single article at a time.

More explicity comprehended, the invention has to do with a slice holder and dispenser characterized by a vertically elongated container in which slices of bread are systematically stacked, said contained having fixed bottom, top, side, back, and front walls, the latter having a slice ejecting and withdrawing slot, the latter being in communication with said bottom wall, said slot being sized for the withdrawal of a single slice, a single slice receiving and delivery tray slidably keyed on said bottom wall and projectible from the interior of the container through said slot, the trailing end of said tray having an upstanding horizontal member which is wedge-shaped in cross-section, the inclined surface of said member being inclined toward said bottom wall, and in combination with a vertically liftable and lowerable check-stop which is cooperable with said rear wall, and wherein said means, when engaged by said member, is lifted thereby and which in and of itself is lowered to its normal set position by forces of gravity.

Objects and advantages in addition to those specified will become more readily apparent from the following description and the accompanying sheets of drawings.

In the accompanying drawings, wherein like numerals are employed to designate like parts throughout the same:

Figure 5 is a perspective view of the tray by itself;

Figure 6 is a fragmentary elevational view of the rear side of a modified construction wherein Figure 8 is reviewed in a direction from right to left;

Figure 7 is a fragmentary vertical section on the line 7—7 of Figure 6 looking in the direction of the arrows;

Figure 8 is a sectional view based on Figure 7 but showing the manner in which the parts perform and are interrelated to each other when the tray is withdrawn; and, Figure 9 is a fragmentary perspective view of what is hereinafter referred to as a liftable and lowerable slot closing shutter seen in Figures 7 and 8.

Figure 2:
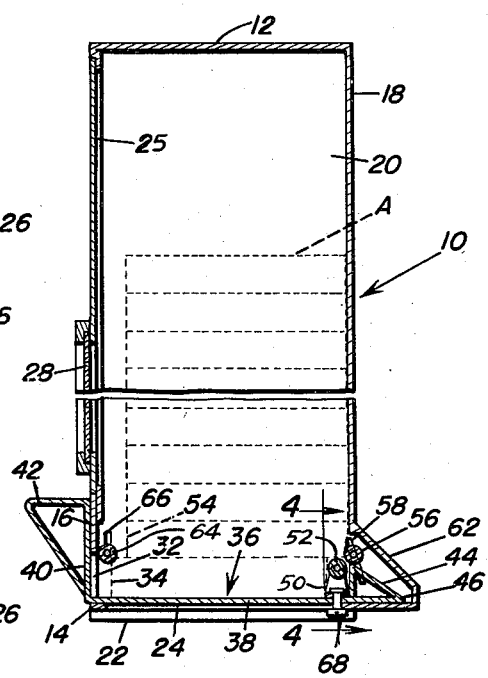
Figure 2 is a view in vertical section and shown fragmentarily and taken on the approximate line 2—2 of Figure 1 looking in the direction of the arrows.
Figure 3:
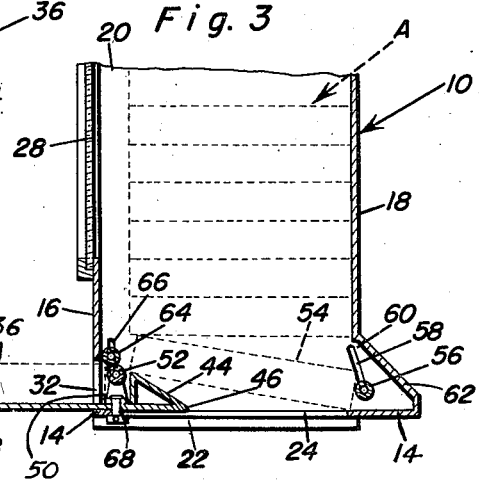
Figure 3 is a fragmentary view based on Figure 2 and showing the lower end portion with the withdrawing or ejector tray in its projected position.
Figure 4:
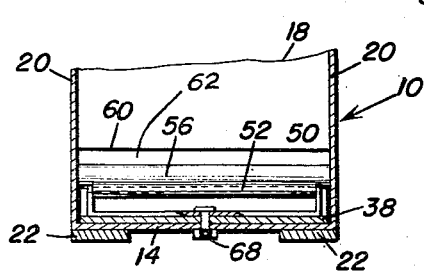
Figure 4 is a fragmentary sectional and elevational view on the vertical line 4—4 of Figure 2 looking in the direction of the arrows.

Referring now to the drawings, it is to be pointed out that there is a slight modification in construction in what may be called the lower rear wall portion of the container as will be evident to the reader by comparing the Figures 2, 3, and 4, with 6, 7, and 8. It is believed, however, that this means may be generically covered in this portion of the description and for this reason the same reference numerals are being used to identify like or identical parts for convenience of description and an understanding of the particulars.

Figure 1:
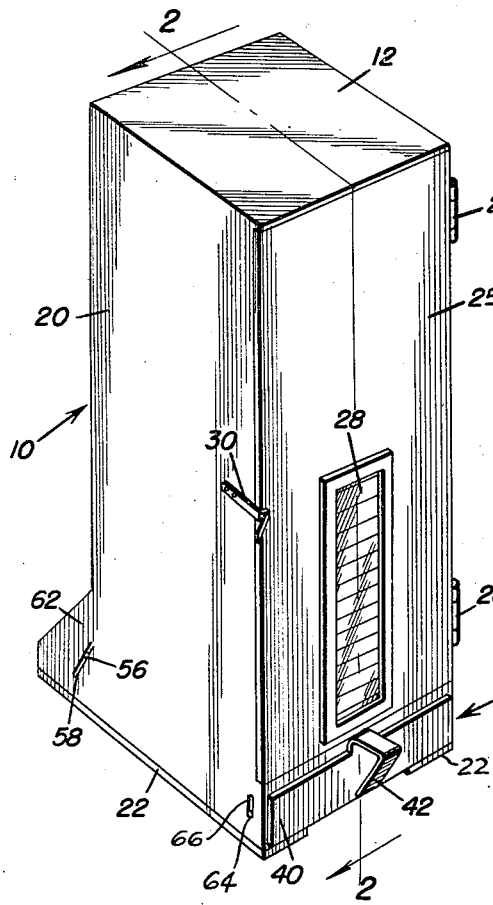
Figure 1 is a perspective view of a sliced bread holder and dispenser constructed in accordance with the principles of the present invention.

To this end, the container, in a unitary sense, is denoted by the numeral 10. This is of general rectangular form and is adapted to hold a complete loaf of bread in the customary sliced form. The container is of suitable light weight non-corrodible sheet material, and may, of course, be constructed of commercial plastics. It is characterized (Figs. 1 and 2) by a top wall 12, bottom wall 14, front wall 16, back wall 18, and side walls 20—20. Suitable strip-like rests 22 are secured to the under side of the bottom wall 14 and the bottom wall is centrally provided with a keying slot 24. The front wall may include as a complement thereof, an openable and closable door 25 which latter is suitably hinged in place at 26—26 and is provided with a sight window 28 and latch means 30. As best shown in Figures 2, 3, 7, and 8, the front wall is provided with a slice-withdrawing horizontally disposed slot 32 which is of a size to permit the lowermost slice of bread 34 to be ejected. The ejecting means takes the form, as before stated, of a slidably mounted tray which is denoted by numeral 36. It is best shown in Figure 5, and comprises a flat plate 38 having an upstanding vertical front wall 40, normally closing the slot 32, said front wall having suitable handle means 42. At the opposite or trailing end of the tray, there is a horizontally disposed member which may be conveniently referred to as a wedge 44. The vertex end of the wedge is denoted at 46. Adjacent to the vertical wall 48 of the wedge, there is a U-shaped bracket 50 having a slice holding roller 52 freely mounted for rotation in the manner shown. This roller idles freely and rides beneath the second slice of bread which is referred to at 54 and holds the latter up in its non-dropping position until the stage in the operation permits the desired "drop" to take place.

This roller 52 is also sort of a follower in that it permits the slice 34 to rest in the tray between said roller and the front wall and to be pulled out while the tray as shown reasonably well in the dotted line illustration in Figures 2 and 3 progressively considered. It might be stated, in connection with Figure 3, that the wedge 44 has its inclined surface inclining rearwardly and downwardly toward the bottom and this wedge in one of its purposes serves to underride the slice 54 as the tray is pushed in from its extended position to its normal return and slice-pick-up position. In a construction as shown, it might otherwise occur that the slice 54 could drop down and get in the way of the return movement of the tray. With this wedge, the knife edge rides under the slice "cams" the slice up so that it is maintained in a horizontal plane and so that it will not become accidentally jammed between the returning tray and the back wall 18 of the container. The wedge also has another and highly important function and that is to operate what is broadly referred to as slice check-stop means. This means, as shown in Figures 1 to 4, takes the form of a liftable and lowerable freely turnable roller 56, having journals slidably mounted in the cam slots 58 formed in the lower portions of the side walls 20 somewhat in communication with the rear wall slot 60 and the extension roller inclosure 62. This inclosure serves to accommodate the wedge 44 when the tray is in its fully retracted position as shown in Figure 2. It will be seen therefore, that the wedge underrides the roller 56 and lifts the same up in the cam slots 58 to assume the position shown as "normal" in Figure 2. Of course, when the tray is pulled out, this roller means 56 drops down under the forces of gravity and the roller takes the "down" position seen in Figure 3 where it then becomes a check-stop for the slice 54.

Therefore, the roller 56 prevents the next above slice 54 from being forced accidentally through the slot 60 and into shield 62 and interfering with the smooth over-all operation of the invention.

There is also a third idling roller provided in the construction disclosed and this one is called a gage, that is a slice thickness gage. It cooperates with the front slot 32 and is denoted by the numeral 64 and has journals slidably mounted in vertical slots 66—66 provided in the side walls 20—20. The normal "down" position is one wherein said roller 64 is approximately level with the upper edge of the slot 32 as shown, for example, in Figures 2, 3, 7, and 8. By using this roller 64, each slice which is ejected through the slot 32 is more or less regulated and in case the slices are a little thicker than usual, the roller 64 rises up to a self accommodating plane and allows the slice to pass outwardly through the slot 32. It will be noticed also that the traveling roller which is carried by the tray, that is the roller 52, travels in a plane beneath the lowermost position of the gage roller 64 so that there is no likelihood of the two rollers colliding with each other and interfering with smooth operation. It is to be pointed out here that the tray 36 is keyed to the bottom 14 and this is accomplished by bolt and nut means 68 which not only serves to fasten the U-shaped bracket 50 on the tray but fits into the keying slot 24 and provides the desired mechanical association and connection of parts.

With reference now to the slight modificaton in the check-stop means, attention is directed to Figures 6 to 9. In Figure 9, there is shown a fragmentary portion of a vertically liftable and lowerable shutter forming plate 70 which is broadly referred to as shutter means 72.

This plate is arranged on the inside of the back wall 18 and is slidably fastened thereto by bolt and nut means 73. The plate is flat and, in practice, the lower end drops down over and partially covers the cooperating rear wall slot 74. This shutter plate is gravity lowerable and is liftable to an elevated position by the return movement of the extensible and retractible tray 36. More specifically, the lower edge portion of the plate is provided with bearing brackets 76—76 with the bearing holes denoted at 78 and which serve to accommodate the journals or trunnions on the ends of the idling check-stop roller 80. In this form of the invention, instead of including the extension or shield portion 62, the back wall is simply provided with a slot and the shutter drops down and normally covers a portion of the slot. The slot serves to accommodate the wedge 44 which moves through and beyond the slot when the tray is retracted, as shown in Figure 7. Figure 8 shows the shutter in its "down" position at which time the tray has been moved out to slice delivering or ejecting and withdrawing position. Assuming then that the tray is returned to its normal slice pick-up position, the wedge rides underneath of the idling roller 80 and in this manner "cams" the roller and shutter to the elevated partial closing position seen in Figure 7. To this end, the roller means 80 is primarily an anti-friction member for the shutter. The shutter covers the slot not only to assist in keeping out dirt and dust but primarily to keep the slice of bread from being accidentally forced through the slot as one slice is being pulled out on the tray and the other slice is ready to drop down to its ready-for-use position.

In operation it will be clear that the container is loaded with a plurality of slices of bread. The device may be made to accommodate and ordinary home-sized loaf or, if used in restaurants and the like, for the longer sandwich loaves. In any event, it is to be assumed that slices or other articles denoted generally at "A" in Figure 2 are stacked in the container. They may be put in position by way of the door closed opening means in the front wall. With the tray 36 in closed position, the lowermost slice delivers itself into the tray by its own weight in readiness for dispensing as is obvious. Referring then to Figure 2, we see the lowermost or first slice 34 about ready to be delivered for use and the second or next usable slice 54 in its expected position. By catching hold of the handle means and pulling the tray out, the slice 34 is ejected and withdrawn through the slot for use. As the tray slides out through the slot 32, the roller 52 travels beneath the bottom of the slice 54 and keeps it up in an out-of-the-way position for a short time. It may be, however, that this particular slice 54 will drop down to the inclined position shown and will rest at one end on the wedge 44 and at the opposite end on the "down" check-stop roller 56. When the tray is returned, the knife like edge 46 of wedge 44 rides underneath the slice 54 and lifts it up again so that it will be clear and ready to drop down into the tray when the tray is fully returned and is ready to be pulled out on the next operation.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A slice holder and dispenser comprising a vertically elongated container in which slices of bread are systematically stacked, said container having fixed bottom, top, side, back, and front walls, said front wall having a slice ejecting and withdrawing slot adjacent said bottom wall, said slot being sized for the withdrawal of a single slice, a single slice receiving and delivery tray slidably keyed on said bottom wall and projectible from the interior of the container through said slot, the trailing end of said tray having an upstanding horizontal member which is wedge-shaped in cross-section, the inclined surface of said member being inclined rearwardly and downwardly toward said bottom wall, said back wall also having a horizontal slot adjacent said bottom wall, said member being projectible through said latter slot, a vertical shutter plate slidably mounted on the interior of said back wall and movable toward said bottom wall in a manner to close said slot under predetermined conditions, said shutter plate being provided on its lower end with an anti-friction roller.

References Cited in the file of this patent

UNITED STATES PATENTS

| | | |
|---|---|---|
| 536,627 | Housh | Apr. 2, 1895 |
| 1,065,098 | Angell | June 17, 1913 |
| 1,257,153 | Turney | Feb. 19, 1918 |
| 1,371,504 | Maddison | Mar. 15, 1921 |
| 1,379,524 | Cassell | May 24, 1921 |
| 1,577,301 | Schultz | Mar. 16, 1926 |
| 1,778,187 | Du Grenier | Oct. 14, 1930 |
| 1,870,162 | Beck | Aug. 2, 1932 |
| 1,973,867 | Cook | Sept. 18, 1934 |
| 2,303,880 | Hilton et al. | Dec. 1, 1942 |
| 2,369,955 | Eastman | Feb. 20, 1945 |
| 2,426,999 | Hilton et al. | Sept. 9, 1947 |

FOREIGN PATENTS

| | | |
|---|---|---|
| 232,830 | Germany | Mar. 23, 1911 |
| 10,534 | France | May 15, 1909 |

(1st addition to Pat. No. 397,950)